(12) United States Patent
Wakerley

(10) Patent No.: US 8,522,050 B1
(45) Date of Patent: Aug. 27, 2013

(54) SYSTEMS AND METHODS FOR SECURING INFORMATION IN AN ELECTRONIC FILE

(75) Inventor: Todd Wakerley, Draper, UT (US)

(73) Assignee: Symantec Corporation, Mountain View, CA (US)

( * ) Notice: Subject to any disclaimer, the term of this patent is extended or adjusted under 35 U.S.C. 154(b) by 339 days.

(21) Appl. No.: 12/844,990

(22) Filed: Jul. 28, 2010

(51) Int. Cl.
*H04L 29/06* (2006.01)

(52) U.S. Cl.
USPC ............... 713/193; 726/23; 726/25; 726/26

(58) Field of Classification Search
USPC ............... 713/189, 193; 726/22, 23, 24, 25, 726/26
See application file for complete search history.

(56) References Cited

U.S. PATENT DOCUMENTS

| | | | | |
|---|---|---|---|---|
| 5,495,533 A * | 2/1996 | Linehan et al. | ............... | 713/155 |
| 5,815,665 A * | 9/1998 | Teper et al. | ............... | 709/229 |
| 7,523,498 B2 * | 4/2009 | Fellenstein et al. | ............... | 726/22 |
| 7,673,324 B2 * | 3/2010 | Tirosh et al. | ............... | 726/1 |
| 7,739,227 B2 * | 6/2010 | Jordan et al. | ............... | 707/600 |
| 7,770,220 B2 * | 8/2010 | Fernstrom | ............... | 726/20 |
| 7,861,301 B2 * | 12/2010 | Fellenstein et al. | ............... | 726/22 |
| 7,941,376 B2 * | 5/2011 | Peckover | ............... | 705/50 |
| 8,046,592 B2 * | 10/2011 | Crane et al. | ............... | 713/193 |
| 8,256,006 B2 * | 8/2012 | Grzymala-Busse et al. | ............... | 726/26 |
| 8,279,479 B2 * | 10/2012 | Dowling et al. | ............... | 358/1.15 |
| 8,347,359 B2 * | 1/2013 | Backa | ............... | 726/4 |
| 2002/0053021 A1 * | 5/2002 | Rice et al. | ............... | 713/155 |
| 2005/0262557 A1 * | 11/2005 | Fellenstein et al. | ............... | 726/22 |
| 2006/0005017 A1 * | 1/2006 | Black et al. | ............... | 713/165 |
| 2006/0075228 A1 * | 4/2006 | Black et al. | ............... | 713/167 |
| 2006/0143459 A1 * | 6/2006 | Villaron et al. | ............... | 713/176 |
| 2007/0192630 A1 * | 8/2007 | Crane et al. | ............... | 713/193 |
| 2007/0220061 A1 * | 9/2007 | Tirosh et al. | ............... | 707/200 |
| 2007/0260971 A1 * | 11/2007 | Rivas et al. | ............... | 715/511 |
| 2008/0126301 A1 * | 5/2008 | Bank et al. | ............... | 707/3 |
| 2008/0215622 A1 * | 9/2008 | Jordan et al. | ............... | 707/104.1 |
| 2008/0300859 A1 * | 12/2008 | Chen et al. | ............... | 704/7 |
| 2009/0094679 A1 * | 4/2009 | Canning et al. | ............... | 726/3 |
| 2009/0119579 A1 * | 5/2009 | Fellenstein et al. | ............... | 715/234 |
| 2009/0144829 A1 * | 6/2009 | Grigsby et al. | ............... | 726/26 |
| 2009/0172786 A1 * | 7/2009 | Backa | ............... | 726/4 |
| 2010/0005509 A1 * | 1/2010 | Peckover | ............... | 726/3 |
| 2010/0024037 A1 * | 1/2010 | Grzymala-Busse et al. | ............... | 726/26 |
| 2010/0106645 A1 * | 4/2010 | Peckover | ............... | 705/50 |
| 2010/0274750 A1 * | 10/2010 | Oltean et al. | ............... | 706/47 |
| 2011/0040983 A1 * | 2/2011 | Grzymala-Busse et al. | ............... | 713/189 |
| 2011/0113412 A1 * | 5/2011 | Kobayashi et al. | ............... | 717/165 |
| 2011/0173444 A1 * | 7/2011 | Sato et al. | ............... | 713/165 |
| 2011/0173676 A1 * | 7/2011 | Peckover | ............... | 726/3 |
| 2011/0283369 A1 * | 11/2011 | Green | ............... | 726/30 |
| 2012/0297462 A1 * | 11/2012 | Peckover | ............... | 726/4 |
| 2013/0086647 A1 * | 4/2013 | Backa | ............... | 726/4 |

OTHER PUBLICATIONS

Website: http://www.udel.edu/topics/encryption/, *Encrypt Your Sensitive Data*, University of Delaware, Sep. 2010 (5 pgs.).

(Continued)

*Primary Examiner* — David García Cervetti
(74) *Attorney, Agent, or Firm* — Holland & Hart LLP

(57) ABSTRACT

A computer-implemented method for securing information in an electronic file is described. Data in the electronic file is automatically scanned. Sensitive information in the electronic file is identified. The sensitive information is extracted from the electronic file. The sensitive information is encrypted. The encrypted sensitive information is stored.

15 Claims, 8 Drawing Sheets

(56) References Cited

OTHER PUBLICATIONS

Website: http://www.4guysfromrolla.com/articles/081705-1.aspx, 4GuysFromRolla.com: *Encrypting Sensitive Data in a Database*, by Scott Mitchell, Aug. 17, 2005 (4 pgs.).

Website: http://www.google.com/url?sa=t&source=web&ct=res&cd=1&ved=OCAwQFjAA&url=http%3A%2F%2Fwww.sti.nasa.gov%2Fpublish%2Fredaction.pdf&ei=0xmyS4nnDI-cswOCo5XmAQ&usg=AFQjCNEI54faAIVQi__oyBvNDy5TcqQJa0g&sig2=ZcUwxWQMq0JnEzanW-7n__A, Redaction of Confidential Information in Electronic Document, Sep. 2010 (13 pgs.).

Website: http://compujurist.com/2009/09/09/review-of-redaction-software-redact-it-by-igc/, *Review of Redaction Software: Redact-It by IGC*, Compujurist.com, Sep. 9, 2009 (5 pgs.).

Website: http://en.wikipedia.org/wiki/Sanitization_(classified_information), *Sanitization* (classified information), Wikipedia, Sep. 27, 2010 (4 pgs.).

Website: http://www.devx.com/Java/10MinuteSolution/21385, Encrypt Sensitive Configuration Data with Java, by Javid Jamae, Jun. 17, 2004 (2 pgs.).

* cited by examiner

SYSTEMS AND METHODS FOR SECURING INFORMATION IN AN ELECTRONIC FILE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Users may use computer systems to store sensitive information. For example, the user may store personal identification information, financial information, passwords to access various accounts, and the like. Some or all of this information may be stored in an electronic storage mechanism. Examples may include an electronic document, an e-mail account for the user, a social networking account, etc. Unauthorized users may gain access to these storage mechanisms and the sensitive information stored in the mechanism. Further, the user may desire to share portions of an electronic file with another user, but may not do so because the file also includes sensitive information. As a result, benefits may be realized by providing system and methods for securing information in an electronic file.

SUMMARY

According to at least one embodiment, a computer-implemented method for securing information in an electronic file is described. Data in the electronic file is automatically scanned. Sensitive information in the electronic file is identified. The sensitive information is extracted from the electronic file. The sensitive information is encrypted. The encrypted sensitive information is stored.

In one embodiment, the sensitive information in the electronic file may be replaced with a redaction identifier. At least one heuristic may be used to identify the sensitive information in the electronic file. In one example, the encrypted sensitive information may be stored in a location that is separate from the location of the electronic file.

In one configuration, credentials associated with a user for a data store may be received. The electronic file may be stored in the data store. The credentials associated with the user for the data store may be verified.

In one embodiment, a request to retrieve encrypted sensitive information may be received. The encrypted sensitive information may be retrieved. In one example, the encrypted sensitive information may be decrypted.

A computing device configured to secure information in an electronic file is also described. The computing device may include a processor and memory in electronic communication with the processor. The computing device may further include a data protection module. The data protection module may be configured to automatically scan data in the electronic file, and identify sensitive information in the electronic file. The data protection module may be further configured to extract the sensitive information from the electronic file, and encrypt the sensitive information. Further, the data protection module may be configured to store the encrypted sensitive information.

A computer-program product for securing information in an electronic file is also described. The computer-program product may include a computer-readable medium having instructions thereon. The instructions may include code programmed to automatically scan data in the electronic file, and code programmed to identify sensitive information in the electronic file. The instructions may further include code programmed to extract the sensitive information from the electronic file, and code programmed to encrypt the sensitive information. The instructions may further include code programmed to store the encrypted sensitive information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
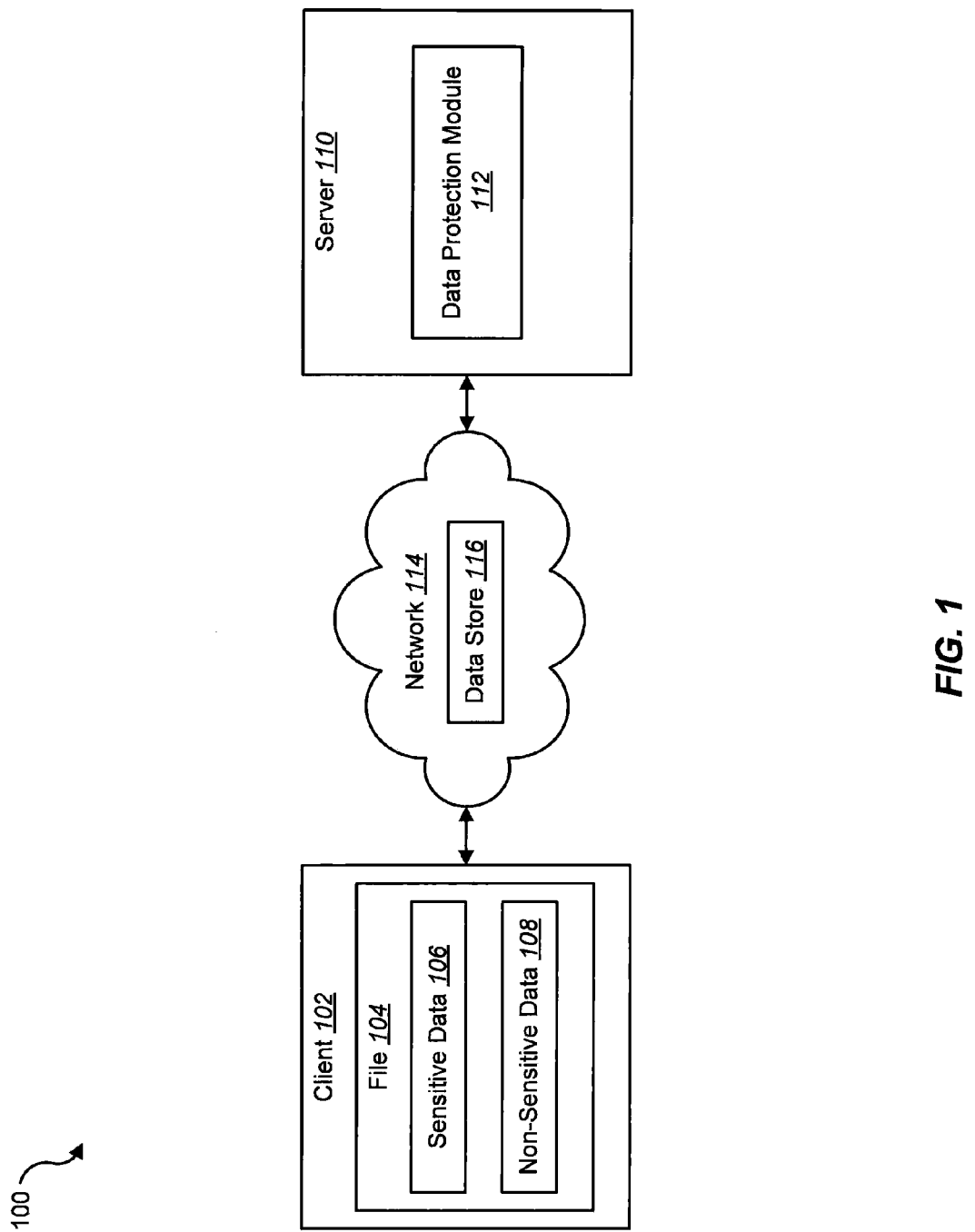
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Users of computing technology may be concerned about the privacy of information stored in files, documents, and the like. Many of these users may use online storage mechanisms to store much of their private information, including e-mail accounts, social networking accounts, etc. Users may also use mobile devices to store much of their private information.

The present systems and methods may continue to store data in online storage mechanisms and mobile devices while protecting sensitive information from intruders or unauthorized users. The present systems and methods may obscure sensitive information from a user's electronic documents by identifying and encrypting the specific sensitive data (e.g., redacting text from a document). The present systems and methods may use a security key and other features to enable the user to unobscure the sensitive information on the document. As a result, the user may retrieve or read once again the sensitive information.

In one embodiment, the present systems and methods may identify sensitive information using customizable heuristics and replace the sensitive information with a redacted marker in the document. The sensitive information in a document may be marked, encrypted, and then stored in an online storage mechanism. In one example, the document may be saved with a reference to the location of the encrypted data. For example, a redacted marker may be placed in each location of the document where sensitive information is found. In one embodiment, the non-sensitive information within the document may remain readable by the user and the sensitive information may be the only data that are obscured. As a result, the present systems and methods may allow the user to use the document without having to retrieve the obscured information.

The present systems and methods may also provide a protection module that is capable of having read/write access to an electronic storage location. An electronic storage location may include, but it not limited to, a web based e-mail account, a website, a computer file system, etc. The protection module may accept user credentials and create a secure online storage location for encrypted and sensitive information. The present systems and methods may store and later retrieve the encrypted information for documents when proper valid credentials are received. The encrypted information may then be decrypted and unobscured on the document when requested by the user with the proper credentials.

FIG. 1 is a block diagram illustrating one embodiment of an environment 100 in which the present systems and methods may be implemented. In one configuration, a client computing device 102 may communicate with a server 110 across a network connection 114, such as the Internet. The client 102 may be a personal computer (PC), a laptop, a personal digital assistant (PDA), a smart phone device, or any other type of computing device.

In one configuration, the client 102 may store a file 104. The file 104 may be an electronic document, a web page, or any other type of electronic file that may include information or data. In one embodiment, the file 104 may include sensitive data 106 and non-sensitive data 108. The sensitive data 106 may be data that a user desires to remain private. For example, the sensitive data 106 may include account information (such as bank account information or other information for a financial institution), personal identifying information for the user, such as a social security number, telephone number, birth date, etc. The non-sensitive data 108 may include data that the user may not particularly desire to remain private.

In one example, the network 114 may be the Internet. The network 114 may include a data store 116. The data store 116 may be an electronic storage mechanism that may store a file 104 for a user. As an example, the data store 116 may be a particular email storage account. For example, the data store 116 may be a Gmail email account, a Yahoo email account, a Hotmail email account, and the like. The data store 116 may be a social networking account for a user. For example, the data store 116 may be a Facebook account, a MySpace account, a Linked-In account, etc. In one embodiment, The file 104 may be stored in the data store 116.

In one configuration, the server 110 may include a data protection module 112. The data protection module 112 may prevent sensitive data 106 from being accessed by unauthorized users. For example, the data protection module 112 may automatically analyze data within the file 104. As previously explained the file 104 may be stored in the data store 116 on the network 114. The data protection module 112 may identify the sensitive data 106 and take appropriate steps to prevent the sensitive data 106 from being accessed or viewed by an unauthorized user.

Figure 2:
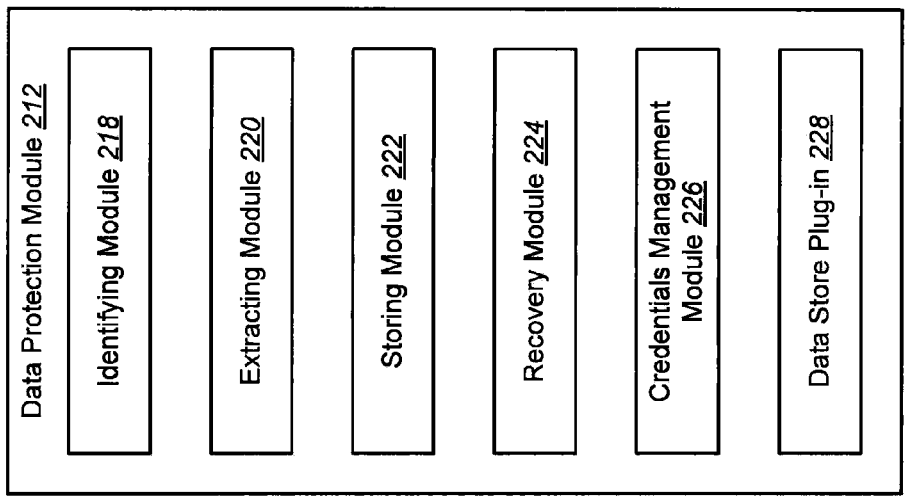
FIG. 2 is a block diagram illustrating a further embodiment of a data protection module.

FIG. 2 is a block diagram illustrating a further embodiment of a data protection module 212. The module 212 may include an identifying module 218. In one configuration, the identifying module 218 may automatically scan a file 104 for sensitive data 106. The identifying module 218 may identify the sensitive data 106 that is part of the file 104. An extracting module 220, may extract the identified sensitive data 106 from the file 104. The extracted sensitive data 106 may be stored in a secure location by a storing module 222. In one example, the extracted sensitive data 106 may be stored in a secure location that is separate and distinct from a data store 116 where the file 104 is stored.

A recovery module 224 may retrieve or recover the stored extracted sensitive data 106. The recovery module 224 may recover the sensitive data 106 so that a user may retrieve or view previously stored sensitive data 106. In one embodiment, the data protection module 212 may further include a credentials managing module 226. The management module 226 may receive and analyze credentials for a user relating to online storage mechanisms. For example, the credentials management module 226 may receive a username and password for a user for a particular online storage mechanism. The management module 226 may determine if the received username and password are verified for that particular storage mechanism. If the credentials are verified, the management module 226 may instruct the recovery module 224 to retrieve the extracted sensitive data 106. In one embodiment, the credentials management module 226 may store credentials relating to a user for various online storage mechanisms. The credentials management module 226 may manage and store the credentials so that the identifying module 218 may automatically scan a file 104 stored in a variety of data stores 116. For example, the credentials management module 226 may store the credentials for a user relating to an email account, a social networking account, etc. The data protection module 212 may then access these various online storage mechanisms by using the stored credentials of the user. The identifying module 218 may begin to automatically scan and identify the sensitive data 106 in each file 104 stored in the various data stores 116 subscribed to by the user.

The data protection module 212 may also include a data store plug-in 228. The data store plug-in 228 may allow the various modules of the data protection module 212 to have read/write access to the various data stores 116 that are being accessed.

Figure 3:
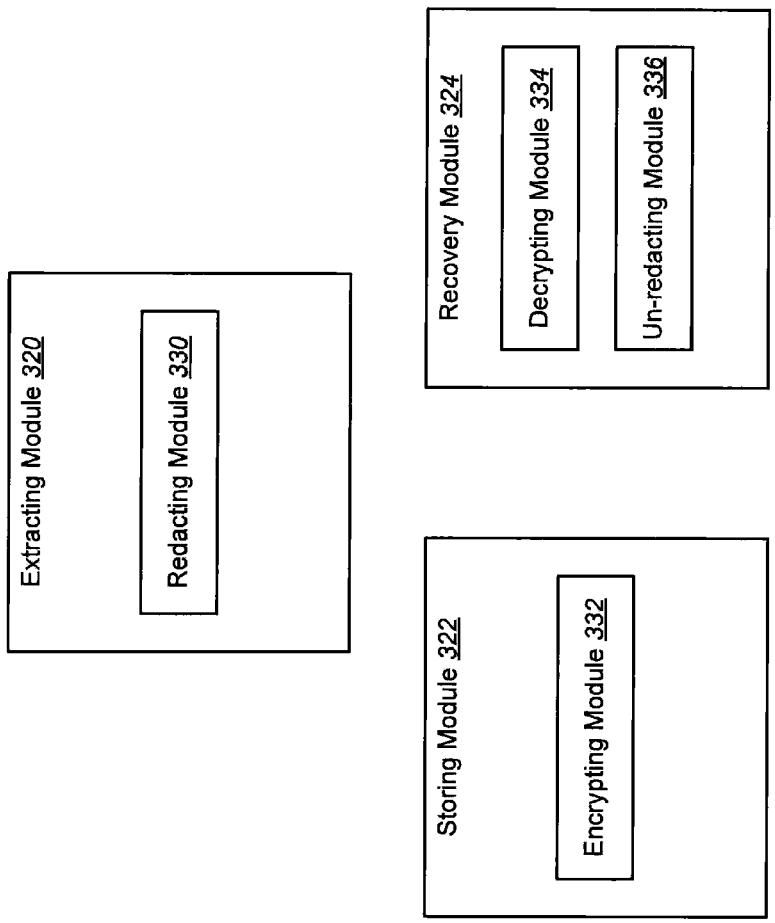
FIG. 3 is a block diagram illustrating a further embodiment of an extracting module, a storing module, and a recovery module.

FIG. 3 is a block diagram illustrating a further embodiment of an extracting module 320, a storing module 322, and a recovery module 324. In one embodiment, the extracting module 320 may include a redacting module 330. As previously explained, the extracting module 320 may extract sensitive data 106 from a file 104. The redacting module 330 may obscure the sensitive data 106 on the file 104. As an example, but not limited to, the redacting module 330 may superimpose a black bar on the sensitive data 106 so that the sensitive data 106 is obscured from view. The redacting module 330 may obscure the sensitive data 106 using other obscuring techniques The storing module 322 may include an encrypting module 332. The encrypting module 332 may encrypt the sensitive data 106 that has been identified by the identifying module 218. The recovery module 324 may include a decrypting module 334 that may decrypt the sensitive data that has been encrypted by the encrypting module 332. The recovery module 324 may further include an un-redacting module 326. The un-redacting module 326 may unobscure the sensitive data 106 so that the data 106 may be accessed and viewed by the user.

Figure 4:
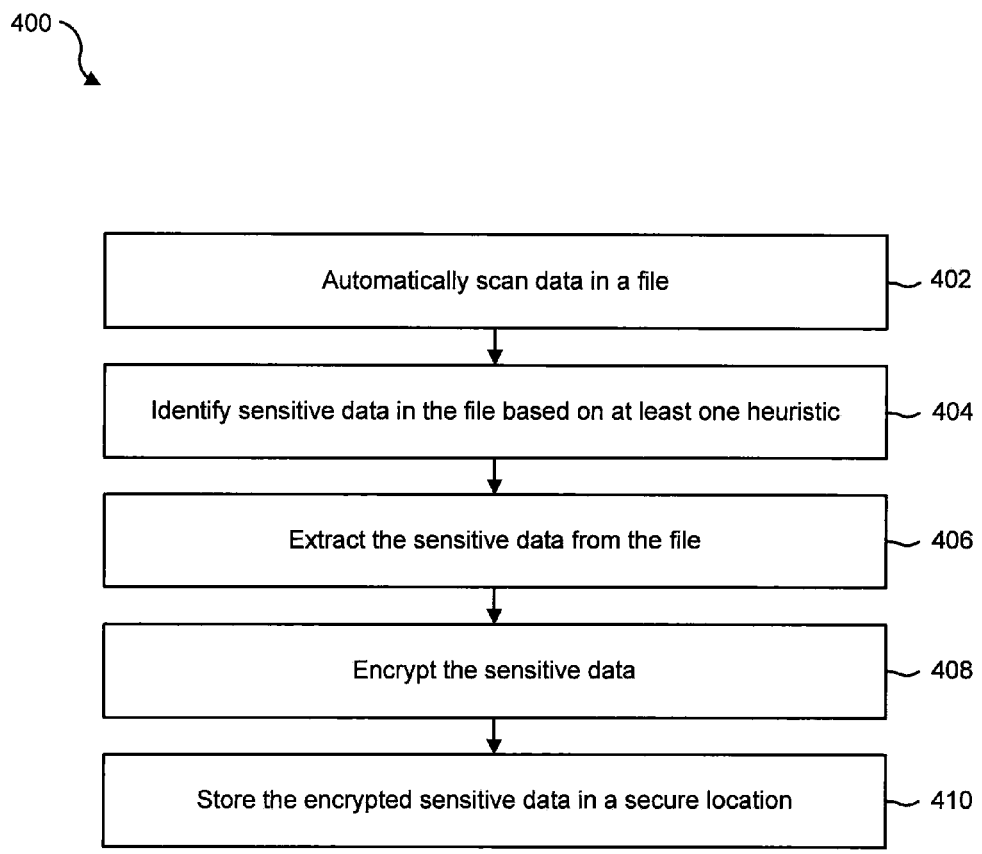
FIG. 4 is a flow diagram illustrating one embodiment of a method for protecting sensitive information in an electronic file or document.

FIG. 4 is a flow diagram illustrating one embodiment of a method 400 for protecting sensitive information in an electronic file or document. The method 400 may be implemented by the data protection module 112.

In one embodiment, data in a file may be automatically scanned 402. Sensitive data in the file may be identified 404 based on at least one heuristic. The sensitive data may be extracted 406 from the file. In one embodiment, the extracted sensitive data may be encrypted 408. In one example, the encrypted sensitive data may be stored 410 in a secure location that is separate and distinct from the location of the electronic file.

Figure 5:
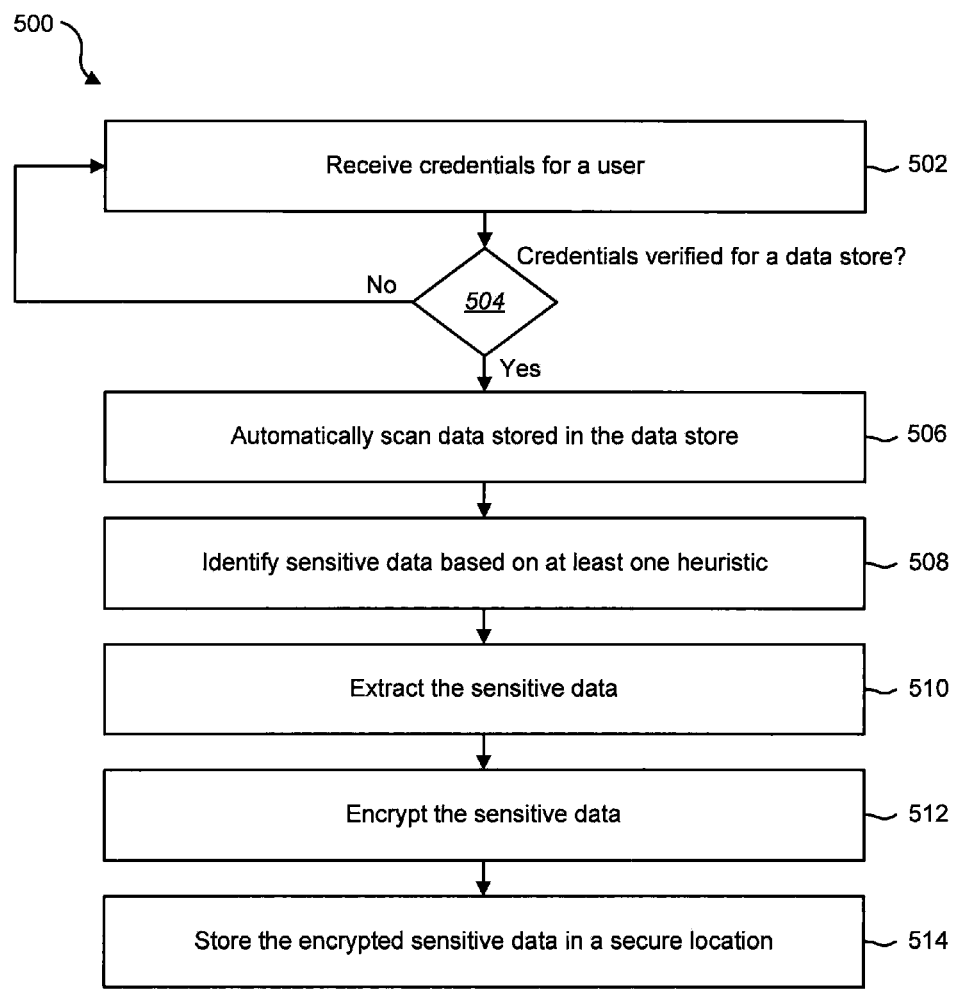
FIG. 5 is a flow diagram illustrating one embodiment of a method for protecting sensitive data in an electronic file or document.

FIG. 5 is a flow diagram illustrating one embodiment of a method 500 for protecting sensitive data in an electronic file or document. The method 500 may be implemented by the data protection module 112.

In one embodiment, credentials for a user may be received 502. A determination 504 may be made as to whether the credentials are verified for a particular data store. If it is determined 504 that the credentials are not verified for a particular data store, the method 500 may return to receive credentials for a user. If, however, it is determined 504 that the received credentials are verified for a particular data store, an electronic file or document that is stored in the data store may be automatically scanned 506. Sensitive data in the electronic file or document may be identified 508 based on at least one heuristic. The sensitive data may be extracted 510 from the file or document, and the extracted sensitive data may be encrypted 512. The encrypted sensitive data may be stored 514 in a secure location that is separate and distinct from the data store that stores the electronic file or document.

Figure 6:
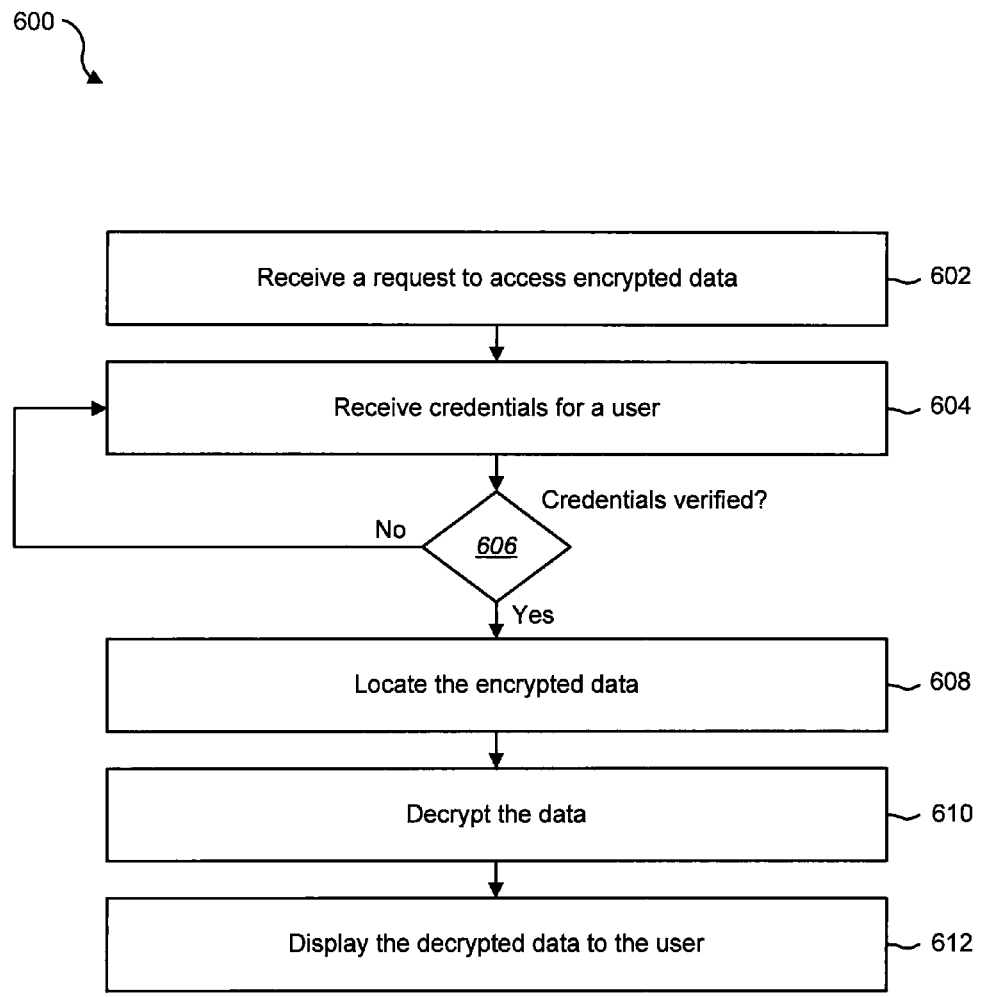
FIG. 6 is a flow diagram illustrating one embodiment of a method for retrieving sensitive data that has been previously obscured or extracted from an electronic file or document.

FIG. 6 is a flow diagram illustrating one embodiment of a method 600 for retrieving sensitive data that has been previously obscured or extracted from an electronic file or document. The method 600 may be implemented by the data protection module 112.

In one embodiment, a request to access encrypted data may be received 602. Credentials for a user may also be received 604. A determination 606 may be made as to whether the credentials are verified. If it is determined 606 the credentials are not verified, the method 600 may return to receive credentials from the user. If, however, it is determined 606 that the credentials are verified, the encrypted data may be located 608 in a secure location. The data may be decrypted 610, and the decrypted data may be displayed 612 to the user. For example, if the sensitive data is redacted on an electronic file or document, the data may be un-redacted so that the user may view or access the data.

Figure 7:
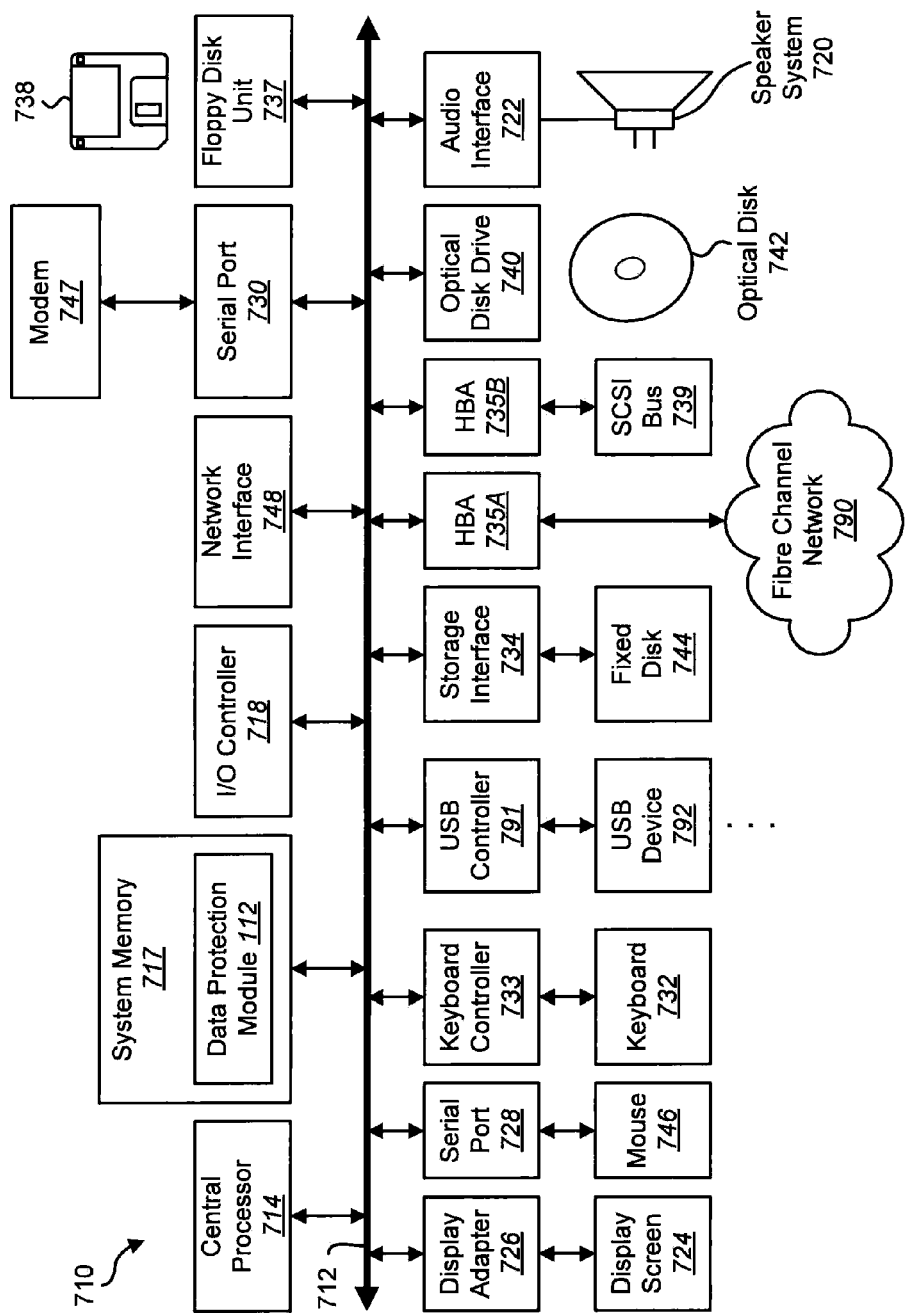
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), multiple USB devices 792 (interfaced with a USB controller 790), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the data protection module 112 to implement the present systems and methods may be stored within the system memory 717. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable medium such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
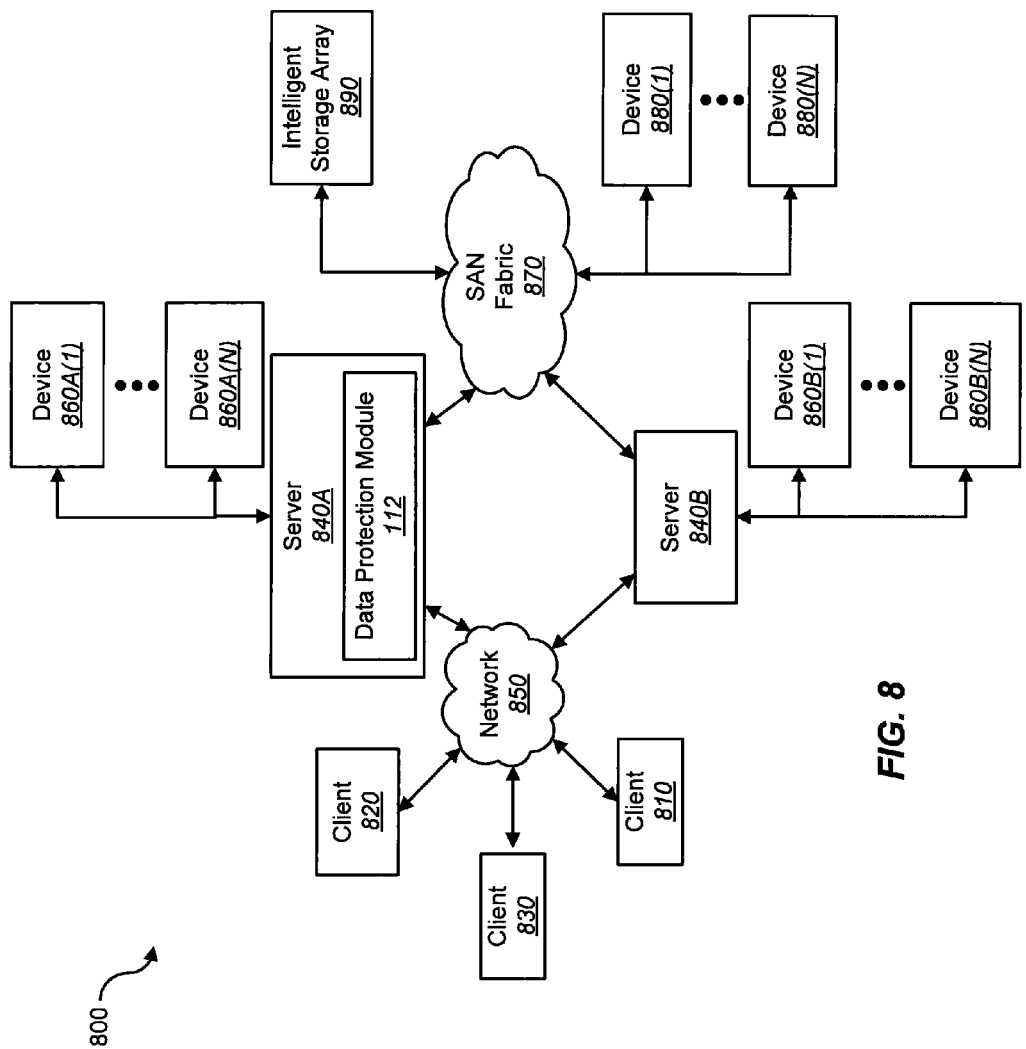
FIG. 8 is a block diagram depicting a network architecture in which client systems, as well as storage servers (any of which can be implemented using computer system), are coupled to a network.

FIG. 8 is a block diagram depicting a network architecture 800 in which client systems 810, 820 and 830, as well as storage servers 840A and 840B (any of which can be implemented using computer system 810), are coupled to a network 850. In one embodiment, the data protection module 112 may be located within a server 840A, 840B to implement the present systems and methods. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820, and 830 to network 850. Client systems 810, 820, and 830 are able to access information on storage server 840A or 840B using, for example, a web browser or other client software (not shown). Such a client allows client systems 810, 820, and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securing information in an electronic file, comprising:
   receiving credentials for at least one selected online data store of a plurality of online data stores that are subscribed to by a user;
   securing sensitive information in at least one electronic file that is stored in the at least one selected online data store, wherein securing sensitive information comprises:
      automatically accessing the at least one selected online data store using the credentials;
      automatically scanning data in the at least one electronic file;
      identifying sensitive information in the at least one electronic file;
      extracting the sensitive information from the at least one electronic file;
      encrypting the sensitive information;
      storing the encrypted sensitive information in a storage location; and
      replacing the extracted sensitive information in the at least one electronic file with a redaction identifier, the redaction identifier referencing the storage location of the encrypted sensitive information.

2. The method of claim 1, further comprising using at least one heuristic to identify the sensitive information in the at least one electronic file.

3. The method of claim 1, further comprising storing the encrypted sensitive information in a location that is separate from the location of the at least one electronic file.

4. The method of claim 1, further comprising verifying the credentials associated with the user for the at least one selected online data store.

5. The method of claim 1, further comprising receiving a request to retrieve encrypted sensitive information.

6. The method of claim 5, further comprising retrieving the encrypted sensitive information.

7. The method of claim 6, further comprising decrypting the encrypted sensitive information.

8. A computing device configured to secure information in an electronic file, comprising:
   a processor;
   memory in electronic communication with the processor;
   instructions being stored in the memory, the instructions being executable by the processor to:
      receive credentials for at least one selected online data store of a plurality of online data stores that are subscribed to by a user;
      secure sensitive information in at least one electronic file that is stored in the at least one selected online data store, wherein the instructions to secure sensitive information comprise instructions executable by the processor to:
         automatically access the at least one selected online data store using the credentials;
         automatically scan data in the at least one electronic file;
         identify sensitive information in the at least one electronic file;
         extract the sensitive information from the at least one electronic file;
         encrypt the sensitive information;
         store the encrypted sensitive information in a storage location; and
         replace the extracted sensitive information in the at least one electronic file with a redaction identifier, the redaction identifier referencing the storage location of the encrypted sensitive information.

9. The computing device of claim 8, wherein the instructions are further executable by the processor to use at least one heuristic to identify the sensitive information in the at least one electronic file.

10. The computing device of claim 8, wherein the instructions are further executable by the processor to store the encrypted sensitive information in a location that is separate from the location of the at least one electronic file.

11. The computing device of claim 8, wherein the instructions are further executable by the processor to verify the credentials associated with the user for the at least one selected online data store.

12. The computing device of claim 8, wherein the instructions are further executable by the processor to receive a request to retrieve encrypted sensitive information.

13. The computing device of claim 8, wherein the instructions are further executable by the processor to retrieve the encrypted sensitive information.

14. The computing device of claim 13, wherein the instructions are further executable by the processor to decrypt the encrypted sensitive information.

15. A computer-program product for securing information in an electronic file, the computer-program product comprising a non-transitory computer-readable medium having instructions thereon, the instructions being executable by a processor to:
   receive credentials for at least one selected online data store of a plurality of online data stores that are subscribed to by a user;
   secure sensitive information in at least one electronic file that is stored in the at least one selected online data store, wherein the instructions to secure sensitive information comprise instructions executable by the processor to:
      automatically access the at least one selected online data store using the credentials;
      automatically scan data in the at least one electronic file;
      identify sensitive information in the at least one electronic file;
      extract the sensitive information from the at least one electronic file;
      encrypt the sensitive information;
      store the encrypted sensitive information in a storage location; and
      replace the extracted sensitive information in the at least one electronic file with a redaction identifier, the redaction identifier referencing the storage location of the encrypted sensitive information.

* * * * *